US009235648B2

(12) United States Patent
O'Sullivan et al.

(10) Patent No.: US 9,235,648 B2

(45) Date of Patent: Jan. 12, 2016

(54) AUTOMATED SURFACING OF TAGGED CONTENT IN VERTICAL APPLICATIONS

(75) Inventors: Patrick J. O'Sullivan, Dublin (IE); Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 12/015,245

(22) Filed: Jan. 16, 2008

(65) Prior Publication Data

US 2009/0182713 A1 Jul. 16, 2009

(51) Int. Cl.
*G06F 3/00* (2006.01)
*G06F 17/30* (2006.01)

(52) U.S. Cl.
CPC ................................ *G06F 17/30884* (2013.01)

(58) Field of Classification Search
CPC ................................................ G06F 17/30884
See application file for complete search history.

(56) References Cited

U.S. PATENT DOCUMENTS

| | | | | |
|---|---|---|---|---|
| 6,725,227 | B1 * | 4/2004 | Li | 1/1 |
| 7,133,862 | B2 * | 11/2006 | Hubert et al. | 1/1 |
| 7,421,645 | B2 | 9/2008 | Reynar | 715/206 |
| 7,747,937 | B2 | 6/2010 | Rojer | 715/206 |
| 7,788,590 | B2 | 8/2010 | Taboada et al. | 715/761 |
| 7,844,891 | B2 | 11/2010 | Chandra | 715/208 |
| 2002/0069218 | A1 * | 6/2002 | Sull et al. | 707/501.1 |
| 2003/0101413 | A1 | 5/2003 | Klein et al. | 715/513 |
| 2004/0187074 | A1 * | 9/2004 | Keohane et al. | 715/501.1 |
| 2004/0205694 | A1 * | 10/2004 | James et al. | 717/104 |
| 2005/0268219 | A1 | 12/2005 | Roma i Dalfo | 715/512 |
| 2006/0230333 | A1 | 10/2006 | Racovolis et al. | 715/500.1 |
| 2007/0073652 | A1 | 3/2007 | Taboada et al. | 707/3 |
| 2007/0143330 | A1 * | 6/2007 | Tang | 707/102 |
| 2007/0150930 | A1 * | 6/2007 | Koivisto et al. | 725/134 |
| 2008/0125892 | A1 * | 5/2008 | Hoguet | 700/98 |
| 2008/0162275 | A1 * | 7/2008 | Logan et al. | 705/12 |
| 2008/0263135 | A1 * | 10/2008 | Olliphant | 709/203 |
| 2009/0006304 | A1 * | 1/2009 | Ma et al. | 706/52 |
| 2009/0063265 | A1 * | 3/2009 | Nomula | 705/14 |
| 2009/0083326 | A1 * | 3/2009 | Pelton | 707/104.1 |
| 2009/0094189 | A1 * | 4/2009 | Stephens | 707/2 |
| 2009/0100169 | A1 * | 4/2009 | Allen et al. | 709/224 |
| 2013/0167168 | A1 * | 6/2013 | Ellis et al. | 725/12 |

OTHER PUBLICATIONS

"Knowledge Pump: Supporting the Flow and Use of Knowledge" Natalie Glance et al. Oct. 10, 1997.

Paul McFedries, "Folk Widsom", Feb. 2006, IEEE Spectrum, http://spectrum.ieee.org/telecom/internet/folk-widsom.

Peter Hoschka, "CSCW Research at GMD-FIT: From Basic Groupware to the Social Web", Aug. 1998, SIGGROUP Bulletin, vol. 19, No. 2, p. 8.

* cited by examiner

*Primary Examiner* — Tarek Chbouki

(74) *Attorney, Agent, or Firm* — Steven M. Greenberg, Esq.; CRGO Law

(57) ABSTRACT

Embodiments of the present invention address deficiencies of the art in respect to social bookmarking and provide a method, system and computer program product for automated surfacing of tagged content in a vertical application. In an embodiment of the invention, a method for automatically surfacing tagged content in a vertical application can be provided. The method can include parsing text from content in an end user application, comparing the parsed text to social bookmarks and associated metadata in a social bookmarking system and matching portions of the content to respective ones of the social bookmarks based upon the comparison, and visually emphasizing the matched portions of the content in the end user application.

20 Claims, 2 Drawing Sheets

280ALT1
Auto Surface
Social Bookmark
250
210A
Social Bookmarking System
240
280ALT2
Auto Surface
Portion
290B
210B
220
Text
290A
HOOK
230
230
230
260
O/S
270
App
280
Auto Surface
HOOK

AUTOMATED SURFACING OF TAGGED CONTENT IN VERTICAL APPLICATIONS

REFERENCE TO CO-PENDING APPLICATIONS FOR PATENT

The present application is related to the following co-assigned U.S. patent applications, which are expressly incorporated by reference herein:

U.S. application Ser. No. 12/015,270 entitled "AUTOMATED SURFACING OF TAGGED CONTENT ADJUNCT TO VERTICAL APPLICATIONS", filed on Jan. 16, 2008.

BACKGROUND OF THE INVENTION

1. Field of the Invention

The present invention relates to the field of bookmarking content and more particularly to social bookmarking.

2. Description of the Related Art

Content browsing refers to the retrieval and presentation of electronic content in a browser client. Content generally can include electronic documents, messages, audio, audiovisual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material.

Given the vast amount of content published for accessibility over the Internet, modern content browsers provide a mechanism for ably retrieving previously accessed content. Known as a "bookmark" or "favorite" (collectively referred to as a bookmark), end users can record content of interest as a bookmark. Subsequently, end users can access a list of bookmarks in order to recall the content of interest without being compelled to recall from memory the precise uniform resource indicator (URI) for the content of interest.

While bookmarking reflects the personal experience of individual users, social bookmarking provides a foundation for users within a social group to store, organize, share and search the bookmarks collectively established by the users within the social group. In operation, a social bookmarking system, users save links to memorable content. Unlike traditional bookmarks however, in a social bookmarking system the links subsequently can be published for public inspection and use so as to provide a communal repository of bookmarks. Consequently, groups of the users can access the links encapsulated within respective social bookmarks, though the groups of users in fact may never have viewed the associated content—a prerequisite for a traditional bookmark.

Social bookmarking services often encourage users in a social network to annotate bookmarks with meta-information rather than merely storing bookmarks in a traditional file hierarchy. As such, users processing annotations for a social bookmark can view the social bookmark for content along with meta-information pertaining to the bookmark, for instance a number of users having bookmarked the content. Further, some social bookmarking services infer clusters of bookmarks from the relationship of corresponding annotations. Finally, many social bookmarking services provide subscription based feeds for lists of bookmarks, including lists organized by annotations. Consequently, subscribers can become aware of new bookmarks as the bookmarks are saved, shared, and annotated by other users.

Social bookmarking systems often follow an "inward" bookmarking metaphor. The inward bookmarking metaphor provides for the tagging of content in a browser and the storage of the bookmark (and subsequent access of the bookmark) from a central location. Therefore, in the inward bookmarking metaphor, users leave an active application to interact with a different application in order determine topical or interesting knowledge provided by social bookmarks. The "outward" bookmarking metaphor recognizes the clumsiness of the inward bookmarking metaphor and provides several tools for propogating social bookmarking knowledge into the active application. Examples include tag clouds enabled to bring users to a central bookmarking system or to draw information from a central bookmarking system from within an active application.

BRIEF SUMMARY OF THE INVENTION

Embodiments of the present invention address deficiencies of the art in respect to social bookmarking and provide a novel and non-obvious method, system and computer program product for automated surfacing of tagged content in a vertical application. In an embodiment of the invention, a method for automatically surfacing tagged content in a vertical application can be provided. The method can include parsing text from content in an end user application, comparing the parsed text to social bookmarks in a social bookmarking system and matching portions of the content to respective ones of the social bookmarks based upon the comparison, and directing a visual emphasis of the matched portions of the content in the end user application.

In one aspect of the embodiment, comparing the parsed text to social bookmarks in a social bookmarking system and matching portions of the content to respective ones of the social bookmarks based upon the comparison further can include restricting the parsed text to a limited vocabulary when comparing the parsed text to the social bookmarks. In another aspect of the embodiment, the method further can include toggling the visual emphasis of the matched portions of the content in the end user application. In yet another aspect of the embodiment, the method further can include appending a source indicator for the visually emphasized matched portions of the content.

In another embodiment of the invention, a social bookmarking data processing system can be provided. The system can include a social bookmarking system executing in a host server and managing a set of social bookmarks. The system further can include an end user application executing separately from the social bookmarking system and providing content in a display. Finally, the system can include auto-surfacing logic coupled to the end user application. The logic can include program code enabled to extract the content from the display, to pass the content to the social bookmarking system for parsing into text, for comparing to the social bookmarks, and for matching portions of the content to respective ones of the social bookmarks based upon the comparison, and to direct a visual emphasis of the matched portions of the content in the end user application.

In one aspect of the embodiment, the auto-surfacing logic subclasses a display event in the end user application. In another aspect of the embodiment, the auto-surfacing logic is a helper application coupled to the end user application. In yet another aspect of the embodiment, the auto-surfacing logic is embedded as part of the end user application. Finally, in even yet another aspect of the embodiment, the auto-surfacing logic resides in the host server and has a hook into the end user application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the automated surfacing of tagged content in a vertical application. In accordance with an embodiment of the present invention, content in an end user application can be compared with established social bookmarks in a social bookmarking system. Portions of the content known to be associated with one or more of the established social bookmarks can be identified and visually distinguished within the end user application. In this way, the content of the end user application can be integrated with the social bookmarking system without requiring the end user to refer separately to the social bookmarking system.

Figure 1:
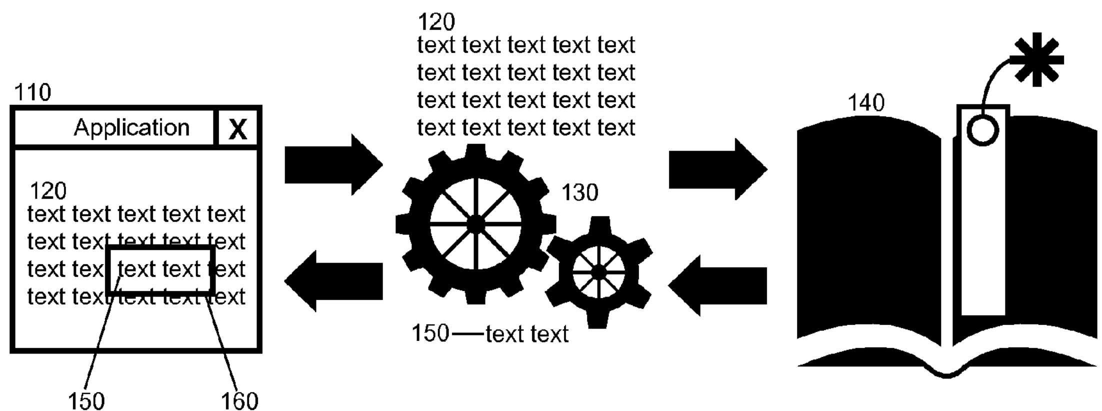
FIG. 1 is a pictorial illustration of a process for the automated surfacing of tagged content in a vertical application.

In illustration, FIG. 1 pictorially depicts a process for the automated surfacing of tagged content in a vertical application. As shown in FIG. 1, an end user application 110 can provide a display of content 120. The end user application 110 can be communicatively coupled to a social bookmarking system 140 through a helper application 130. The helper application 130 can pull the content 120 from the end user application and pass the same to the social bookmarking system 140 for comparison with one or more established social bookmarks. Thereafter, portions 150 of the content 120 associated with established social bookmarks in the social bookmarking system 140 can be provided visual emphasis 160 in the end user application 110.

Figure 2:
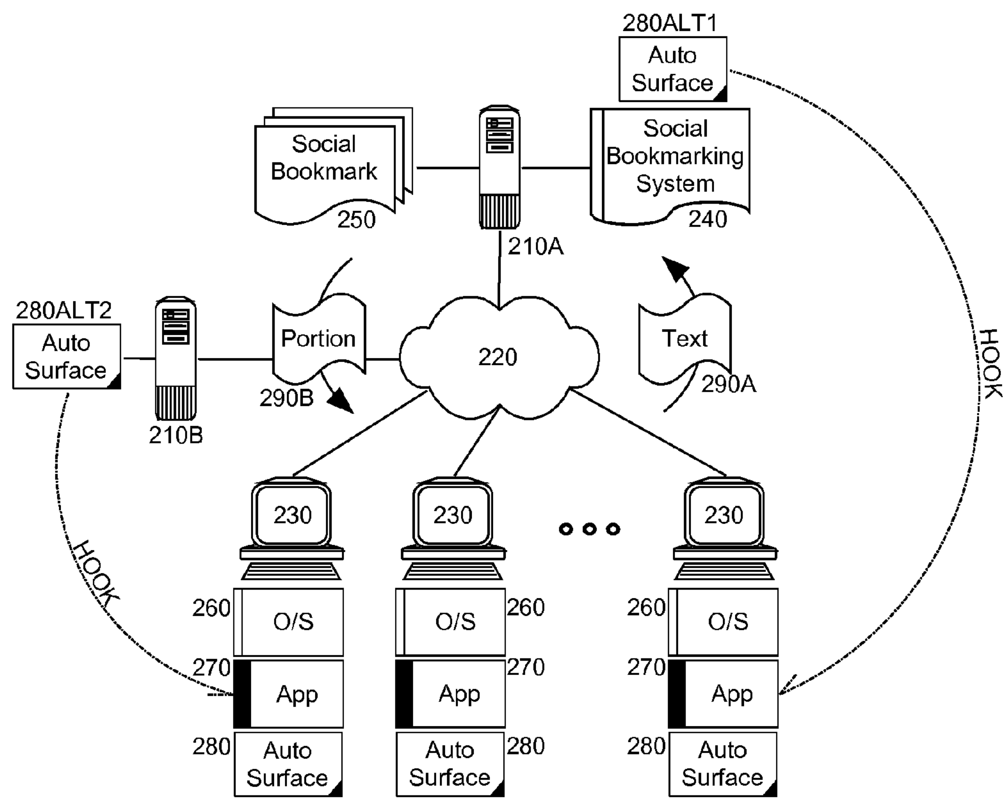
FIG. 2 is a schematic illustration of a social bookmarking data processing system configured for automated surfacing of tagged content in a vertical application; and, FIG. 3 is a flow chart illustrating a process for automated surfacing of tagged content in a vertical application.

The process of FIG. 1 can be performed within a social bookmarking data processing system. In illustration, FIG. 2 schematically depicts a social bookmarking data processing system configured for automated surfacing of tagged content in a vertical application. The system can include a host server 210A configured for communicative coupling to one or more clients 230 over computer communications network 220. The host server 210A can support the operation of a social bookmarking system 240 managing one or more social bookmarks 250 on behalf of the clients 230.

Each of the clients 230 can include an operating environment 260, for example a virtual machine or operating system. The operating environment 260 further can support the operation of one or more end user applications 270, for example a word processor, spreadsheet, database application, Web browser and the like. Notably, only a single end user application 270 is shown in FIG. 2 for the purpose of illustrative simplicity. In accordance with an embodiment of the invention, auto-surfacing logic 280 can be coupled to or incorporated as part of the end-user application 270. For instance, the auto-surfacing logic 280 can be provided as a helper application, or the auto-surfacing logic 280 can be a sub-class of the event loop for each of the end user applications 270 selected from a list of active applications, trapping and modifying a display event.

The auto-surfacing logic 280 can include program code enabled to detect an attempt to display content in the end-user application 270. In response, the program code can be further enabled to pass the content 290A to the social bookmarking system 240 for comparison with the social bookmarks, and associated metadata 250. Portions 290B of the content 290A matching the social bookmarks and associated metadata 250 can be returned to the auto-surfacing logic 280. Thereafter, the program code can be enabled to visually emphasize the portions 290B in the display in the end user application 270. For example, the portions 290B can be proportionately enlarged or more deeply colored or toned in the display of the end user application 270 depending upon a frequency of match to social bookmarks and associated metadata 250.

Optionally, the program code of the auto-surfacing logic 280 can be disposed in the host server 210A, as server-side auto-surfacing logic 280ALT1. The server-side auto-surfacing logic 280ALT1 can establish a hook into each of the applications 270 in order to pull the content 290A and to visually emphasize the portions 290B of the content 290A matching the social bookmarks 250. As another option, the vocabulary used in matching the content 290A with the social bookmarks and associated metadata 250 can be restricted to limit words and phrases of less value and to avoid cluttering the display of the applications 270. As yet a further option, a source identifier can be provided in the display of the applications 270 for the visually emphasized portions 290B indicating a source of the matched ones of the social bookmarks 250. Finally, the visual emphasis of the portions 290B of the content 290 can be toggled on and off at the discretion of the end user.

In another aspect of the embodiment, the program code of the auto-surfacing logic 280ALT2 can be disposed in separately and apart from the applications 270 either hosted in a separate server 21 0B, or as a separate application executing in each of the clients 230 (end user computing devices). As before, the server-side auto-surfacing logic 280ALT2 can establish a hook into each of the applications 270 in order to pull the content 290A and to direct the visual emphasis of the portions 290B of the content 290A matching the social bookmarks 250. The direction of the visual emphasis can be incorporated as a markup language association between the portions 290B of the content 290A and the matched ones of the social bookmarks 250.

Figure 3:
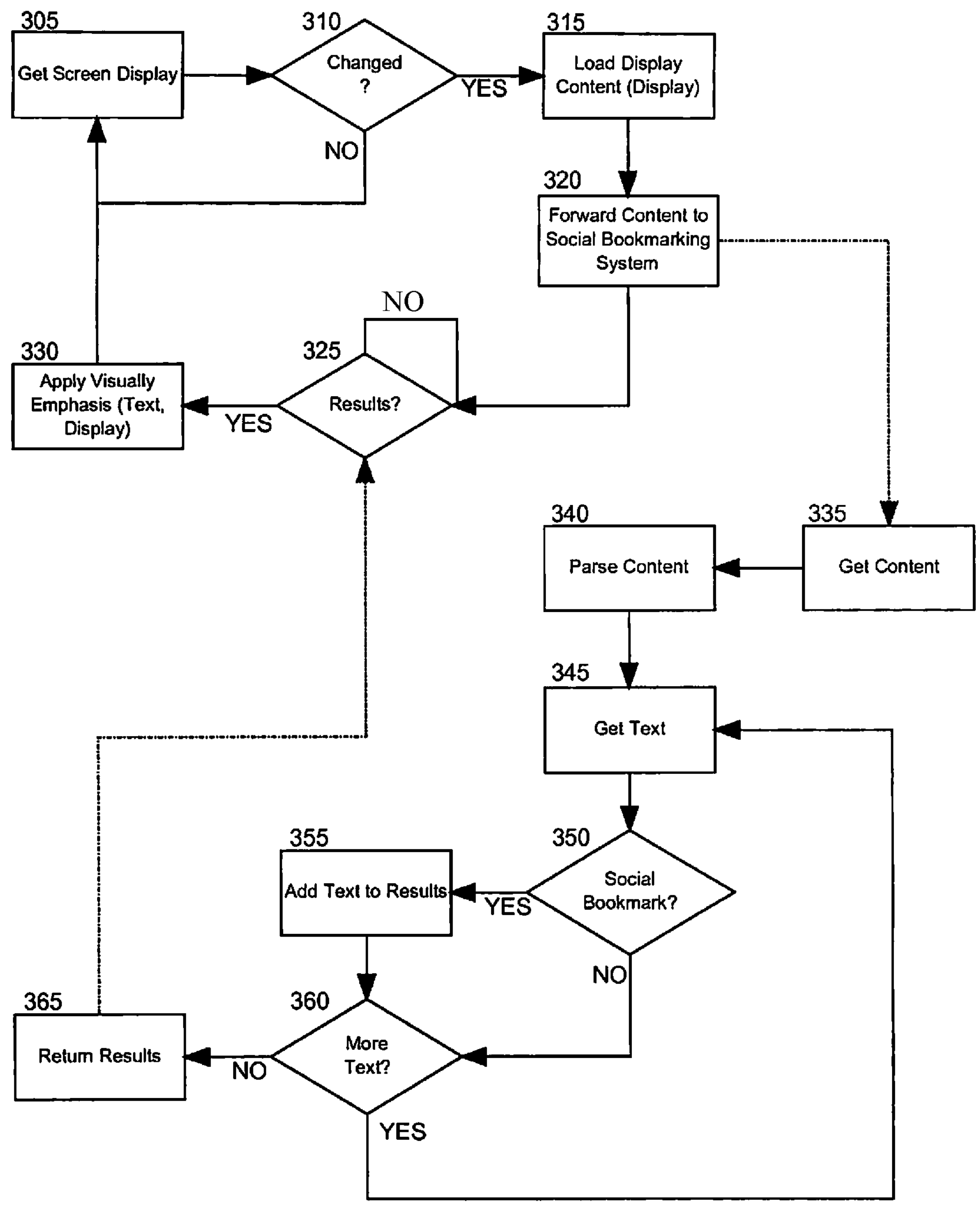

In even yet further illustration, FIG. 3 is a flow chart illustrating a process for automated surfacing of tagged content in a vertical application. Beginning in block 305, a screen display for an end user application can be retrieved and in decision block 310, it can be determined whether the screen display has been updated. If so, in block 315 the display content in the screen display can be loaded and the content can be forwarded to a social bookmarking system in block 320. In block 335, within the social bookmarking system the content can be received and in block 340 the content can be parsed.

In block 345, text can be retrieved from the content. The text can be an individual word or a series of words. In decision block 350, the text can be compared to a set of social bookmarks and associated metadata to determine whether or not the text matches a particular one of the social bookmarks. If so, in block 355, the text can be added to a set of results and, in decision block 360 it can be determined if additional text remains to be compared in the content, or if further comparisons to additional social bookmarks and associated metadata remain to be done. If so, the process can continue through block 345 with additional text. When no further text remains to be processed in the content, in block 365 the results can be returned.

In decision block 325, if it is determined that results have been received from the social bookmarking system, in block 330, the text in the results can be visually emphasized in the display. For instance, the color of the text can be bolder or deeper for text associated with a high frequency of tags for a corresponding social bookmark. Alternatively, the size of the text can be greater for text associated with a high frequency of tags for a corresponding social bookmark. In any event, the process can return to block 305 with the selection of the screen display and the process can repeat for a change in content in the display.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for automatically surfacing tagged content in a vertical application, the method comprising:

parsing text from content in an end user application;

comparing the parsed text to social bookmarks and associated metadata in a social bookmarking system to determine whether the parsed text matches at least one of the social bookmarks in the social bookmarking system by matching portions of the parsed text to respective ones of the social bookmarks and associated metadata; and, upon determining that the parsed text matches the at least one of the social bookmarks in the social bookmarking system, visually emphasizing the matched portions of the parsed text from the content in the end user application by determining a frequency of match to respective ones of the social bookmarks and associated metadata and adjusting a color of text associated with the matched portions of the parsed text proportionately based upon the determined frequency of match so as to visually differentiate the matched portions from the content.

2. The method of claim 1, wherein comparing the parsed text to social bookmarks comprises restricting the parsed text to a limited vocabulary during the comparing.

3. The method of claim 1, further comprising toggling the visual emphasis of the matched portions of the parsed text in the end user application.

4. The method of claim 1, further comprising appending a source indicator in the end user application indicating which one of the social bookmarks for the visually emphasized matched portions of the parsed text.

5. The method of claim 1, wherein the color of text being adjusted is at least one of bolder and deeper for text associated with a high frequency of match to respective ones of the social bookmarks and associated metadata.

6. The method of claim 1, wherein visually emphasizing the matched portions of the parsed text from the content in the end user application by visually differentiating the matched portions of the parsed text from the content further comprises adjusting a font size of text associated with the matched portions of the parsed text proportionately based upon the determined frequency of match to respective ones of the social bookmarks and associated metadata.

7. The method of claim 6, wherein the font size of text being adjusted is greater for text associated with a high frequency of match to respective ones of the social bookmarks and associated metadata.

8. The method of claim 1, wherein the frequency of match is a number of occurrences that portions of the parsed text match respective ones of the social bookmarks and associated metadata.

9. A social bookmarking data processing hardware system, comprising:

a host server executing a social bookmarking system managing a plurality of social bookmarks and associated metadata;

an end user application executing separately from the social bookmarking system and providing content in a display; and at least one processor, the at least one processor configured to extract display content, pass the display content to the social bookmarking system for parsing the display content into text, compare the parsed text to social bookmarks and associated metadata in the social bookmarking system to determine whether the parsed text matches at least one of the social bookmarks in the social bookmarking system by matching portions of the parsed text to respective ones of the social bookmarks and associated metadata, and direct a visual emphasis of the matched portions of the parsed text from the display content by determining a frequency of match to respective ones of the social bookmarks and associated metadata and adjusting a color of text associated with the matched portions of the parsed text proportionately based upon the determined frequency of match so as to visually differentiate the matched portions from the display content in the end user application.

10. The system of claim 9, wherein the at least one processor is further configured to subclass a display event in the end user application.

11. The system of claim 9, wherein the at least one processor configured by a helper application coupled to the end user application.

12. The system of claim 9, wherein the at least one processor is configured by the end user application.

13. The system of claim 9, wherein the at least one processor resides in the host server and has a hook into the end user application.

14. The system of claim 9, wherein the frequency of match is a number of occurrences that portions of the parsed text match respective ones of the social bookmarks and associated metadata.

15. A computer program product comprising a computer usable storage medium having stored therein computer usable program code for automatically surfacing tagged content in a vertical application, the computer program computer usable program code, which when executed by a computer hardware system, causes the computer hardware system to perform parsing text from content in an end user application;

comparing the parsed text to social bookmarks and associated metadata in a social bookmarking system to determine whether the parsed text matches at least one of the social bookmarks in the social bookmarking system by matching portions of the parsed text to respective ones of the social bookmarks and associated metadata; and, upon determining that the parsed text matches the at least one of the social bookmarks in the social bookmarking system, visually emphasizing the matched portions of the parsed text from the content in the end user application by determining a frequency of match to respective ones of the social bookmarks and associated metadata and adjusting a color of text associated with the matched portions of the parsed text proportionately based upon the determined frequency of match so as to visually differentiate the matched portions from the content.

16. The computer program product of claim 15, wherein comparing the parsed text to the social bookmarks comprises restricting the parsed text to a limited vocabulary during the comparing.

17. The computer program product of claim 15, wherein the computer hardware system is further caused to perform toggling the visual emphasis of the matched portions of the parsed text in the end user application.

18. The computer program product of claim 15, wherein the computer hardware system is further caused to perform appending a source indicator in the end user application indicating which one of the social bookmarks for the visually emphasized matched portions of the parsed text.

19. The computer program product of claim 15, wherein the frequency of match is a number of occurrences that portions of the parsed text match respective ones of the social bookmarks and associated metadata.

20. The computer program product of claim 15, wherein visually emphasizing the matched portions of the parsed text from the content in the end user application by visually differentiating the matched portions of the parsed text from the content further comprises adjusting a font size of text associated with the matched portions of the parsed text proportionately based upon the determined frequency of match to respective ones of the social bookmarks and associated metadata.

* * * * *